(12) United States Patent
Singidi et al.

(10) Patent No.: US 11,726,867 B2
(45) Date of Patent: *Aug. 15, 2023

(54) MULTI-PAGE PARITY PROTECTION WITH POWER LOSS HANDLING

(71) Applicant: Micron Technology, Inc., Boise, ID (US)

(72) Inventors: Harish Reddy Singidi, Fremont, CA (US); Kishore Kumar Muchherla, Fremont, CA (US); Xiangang Luo, Fremont, CA (US); Vamsi Pavan Rayaprolu, San Jose, CA (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/741,940

(22) Filed: May 11, 2022

(65) Prior Publication Data

US 2022/0269559 A1 Aug. 25, 2022

Related U.S. Application Data

(63) Continuation of application No. 16/989,478, filed on Aug. 10, 2020, now Pat. No. 11,334,428, which is a (Continued)

(51) Int. Cl.
*G06F 11/10* (2006.01)
*G06F 11/00* (2006.01)
*G06F 11/14* (2006.01)

(52) U.S. Cl.
CPC ........ *G06F 11/1048* (2013.01); *G06F 11/108* (2013.01); *G06F 11/1044* (2013.01); *G06F 11/1441* (2013.01)

(58) Field of Classification Search
CPC ............ G06F 11/1048; G06F 11/1044; G06F 11/108; G06F 11/1441
See application file for complete search history.

(56) References Cited

U.S. PATENT DOCUMENTS

| | | | |
|---|---|---|---|
| 7,904,635 B2* | 3/2011 | Deng | G06F 11/1441 711/158 |
| 8,214,684 B2 | 7/2012 | Hetzler et al. | |

(Continued)

FOREIGN PATENT DOCUMENTS

| | | |
|---|---|---|
| CN | 101344868 | 1/2009 |
| CN | 105183369 | 12/2015 |

OTHER PUBLICATIONS

"Chinese Application Serial No. 201911380065.2, Office Action dated Mar. 22, 2023", with WIPO machine English translation, 20 pages.

*Primary Examiner* — Justin R Knapp
(74) *Attorney, Agent, or Firm* — Schwegman Lundberg & Woessner, P.A.

(57) ABSTRACT

A variety of applications can include use of parity groups in a memory system with the parity groups arranged for data protection of the memory system. Each parity group can be structured with multiple data pages in which to write data and a parity page in which to write parity data generated from the data written in the multiple data pages. Each data page of a parity group can have storage capacity to include metadata of data written to the data page. Information can be added to the metadata of a data page with the information identifying an asynchronous power loss status of data pages that precede the data page in an order of writing data to the data pages of the parity group. The information can be used in re-construction of data in the parity group following an uncorrectable error correction code error in writing to the parity group.

20 Claims, 7 Drawing Sheets

Related U.S. Application Data continuation of application No. 16/267,586, filed on Feb. 5, 2019, now Pat. No. 10,747,612.

(60) Provisional application No. 62/786,889, filed on Dec. 31, 2018.

(56) References Cited

U.S. PATENT DOCUMENTS

| | | |
|---|---|---|
| 8,341,500 B2 | 12/2012 | Byom et al. |
| 9,478,271 B2 | 10/2016 | Chen et al. |
| 10,437,670 B1 | 10/2019 | Koltsidas et al. |
| 10,747,612 B2 | 8/2020 | Singidi et al. |
| 10,789,163 B2 | 9/2020 | Lin |
| 2010/0169543 A1* | 7/2010 | Edgington .............. G06F 3/064 711/E12.078 |
| 2017/0249211 A1 | 8/2017 | Hoei et al. |
| 2018/0157428 A1 | 6/2018 | Li |
| 2018/0357018 A1 | 12/2018 | Karr et al. |
| 2020/0026602 A1 | 1/2020 | Tai et al. |
| 2020/0210280 A1 | 7/2020 | Singidi et al. |
| 2020/0371870 A1 | 11/2020 | Singidi et al. |
| 2021/0034301 A1 | 2/2021 | Zhou et al. |

* cited by examiner

600

| | RAIN PROTECTION | | | | | | |
|---|---|---|---|---|---|---|---|
| | LUN ~ 670 | | | | | | |
| | SB #0 | | | ... | SB #3 | | |
| WL | LP | UP | XP | ... | LP | UP | XP |
| 0 | R0 (APL) | R1 | R2 | ... | R9 | R10 | R11 |
| 1 | R12 | R13 | R14 | ... | R21 | R22 | R23 |
| 2 | R24 | R25 | R26 | ... | R33 | R34 | R35 |
| 3 | R0 (APL) | R1 | R2 | ... | R9 | R10 | R11 |
| 4 | R12 | R13 | R14 | ... | R21 | R22 | R23 |
| 5 | R24 | R25 | R26 | ... | R33 | R34 | R35 |
| 6 | R0 (FLAG=2) | R1 | R2 | ... | R9 | R10 | R11 |
| 7 | R12 | R13 | R14 | ... | R21 | R22 | R23 |
| 8 | R24 | R25 | R26 | ... | R33 | R34 | R35 |
| 9 | R0 (UECC) | R1 | R2 | ... | R9 | R10 | R11 |
| 10 | R12 | R13 | R14 | ... | R21 | R22 | R23 |
| 11 | R24 | R25 | R26 | ... | R33 | R34 | R35 |
| 12 | P0 | P1 | P2 | ... | P9 | P10 | P11 |
| 13 | P12 | P13 | P14 | ... | P21 | P22 | P23 |
| 14 | P24 | P25 | P26 | ... | P33 | P34 | P35 |

Fig. 6

MULTI-PAGE PARITY PROTECTION WITH POWER LOSS HANDLING

PRIORITY APPLICATION

This application is a continuation of U.S. application Ser. No. 16/989,478, filed 10 Aug. 2020, which is a continuation of U.S. application Ser. No. 16/267,586, filed 5 Feb. 2019, now U.S. Pat. No. 10,747,612, which claims the benefit of priority under 35 U.S.C. 119(e) from U.S. Provisional Application Ser. No. 62/786,889, filed 31 Dec. 2018, all of which are incorporated herein by reference in their entirety.

BACKGROUND

Memory devices are typically provided as internal, semiconductor, integrated circuits in computers or other electronic devices. There are many different types of memory, including volatile and non-volatile memory. Volatile memory requires power to maintain its data, and examples of volatile memory include random-access memory (RAM), dynamic random-access memory (DRAM), static RAM (SRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), erasable programmable ROM (EPROM), resistance variable memory, such as phase-change random-access memory (PCRAM), resistive random-access memory (RRAM), magnetoresistive random-access memory (MRAM), and three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the memory cells in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. Unless otherwise clearly indicated by express language or context, MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storage cells of the string. In the example of a vertical string, the polysilicon structure may be in the form of a vertically extending pillar. In some examples, the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells, to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations, to transfer data (e.g., user data and associated integrity data, such as error data and address data, etc.) between the memory devices and the host, or erase operations to erase data from the memory devices.

An SSD has the potential for failure and data loss. A method for protecting data in an SSD has included adding levels of error correction code (ECC) to pages and then recovering data using the ECC. A protection scheme beyond ECC has included utilizing approaches at the device level with the use of multiple memory devices, providing redundant array of independent NAND (RAIN) protection. Versions of SSD data protection technology in these approaches have varied.

Some SSD controllers use parallelism in order to increase SSD performance and locate stored data across a set of flash devices, which may be realized as many relatively smaller flash devices to attain a large capacity associated. with other storage devices. This parallelism in SSDs spreads spread across multiple of the flash devices of the set. This can be referred to striped data without parity. RAIN technology adds user data protection that extends beyond ECC, minimally impacts drive performance, and can optimize NAND management. With a high degree of parallelism already in place within the SSI) by striping, adding a parity protection architecture adds another layer of protection.

RAIN is an umbrella term for data storage schemes that divide and/or replicate data among multiple pages of multiple memory devices, for instance, in order to help protect the data stored in the memory devices. The multiple memory devices in a RAIN array may appear to a user and an operating system of a computing machine as a single memory device. RAIN can include striping (e.g., splitting) data so that different portions of the data are stored on different pages of different memory devices. The portions of the different memory devices that store the split data are collectively referred to as a stripe. In an architecture for a particular RAIN design, a number of the pages of memory cells in a memory array can store a parity portion of a RAIN stripe. For instance, each respective one of the number of pages can include a parity portion of a different RAIN stripe. Since a RAIN stripe can be a combination of user data, other data, and parity data, the parity data can reduce the capacity of the SSD to store user data and can affect the performance of the SSD. RAIN can also include mirroring, which can include storing duplicate copies of data on more than one page of more than one device.

Though MLC NAND technology has enabled high-performance data storage to be widely available at affordable price points, MLC NAND has its limitations. For example, MLC devices are vulnerable to data loss in the event of an unexpected power loss. Frequently, source power to SSDs is shut down. Under normal circumstances, when a computer system is shut down or when it goes into a sleep mode or a hibernate mode, the host computer sends a command signal to the storage device to indicate that the power is going to turn off. Typically, the host system does not shut down until the command is sent and the drive acknowledges the command back to the host computer. The SSD completes any unfinished writes and saves any updated data addressing information before sending this acknowledge message.

An unexpected power loss, on the other hand, is a power loss that is not preceded by a shutdown notification. As a result, the drive cannot close out the final operations before loss of power, which can lead to data and addressing information being lost. Other common terms to describe this situation are "surprise power loss," "dirty power loss," and "asynchronous power loss (APL)."

BRIEF DESCRIPTION OF THE DRAWINGS

The drawings, which are not necessarily drawn to scale, illustrate generally, by way of example, but not by way of limitation, various embodiments discussed in the present document.

FIG. 6 shows an example RAIN mapping table illustrating a RAIN protection scheme using metadata to identify pages affected by an asynchronous power loss, according to various embodiments.

DETAILED DESCRIPTION

Figure 1:
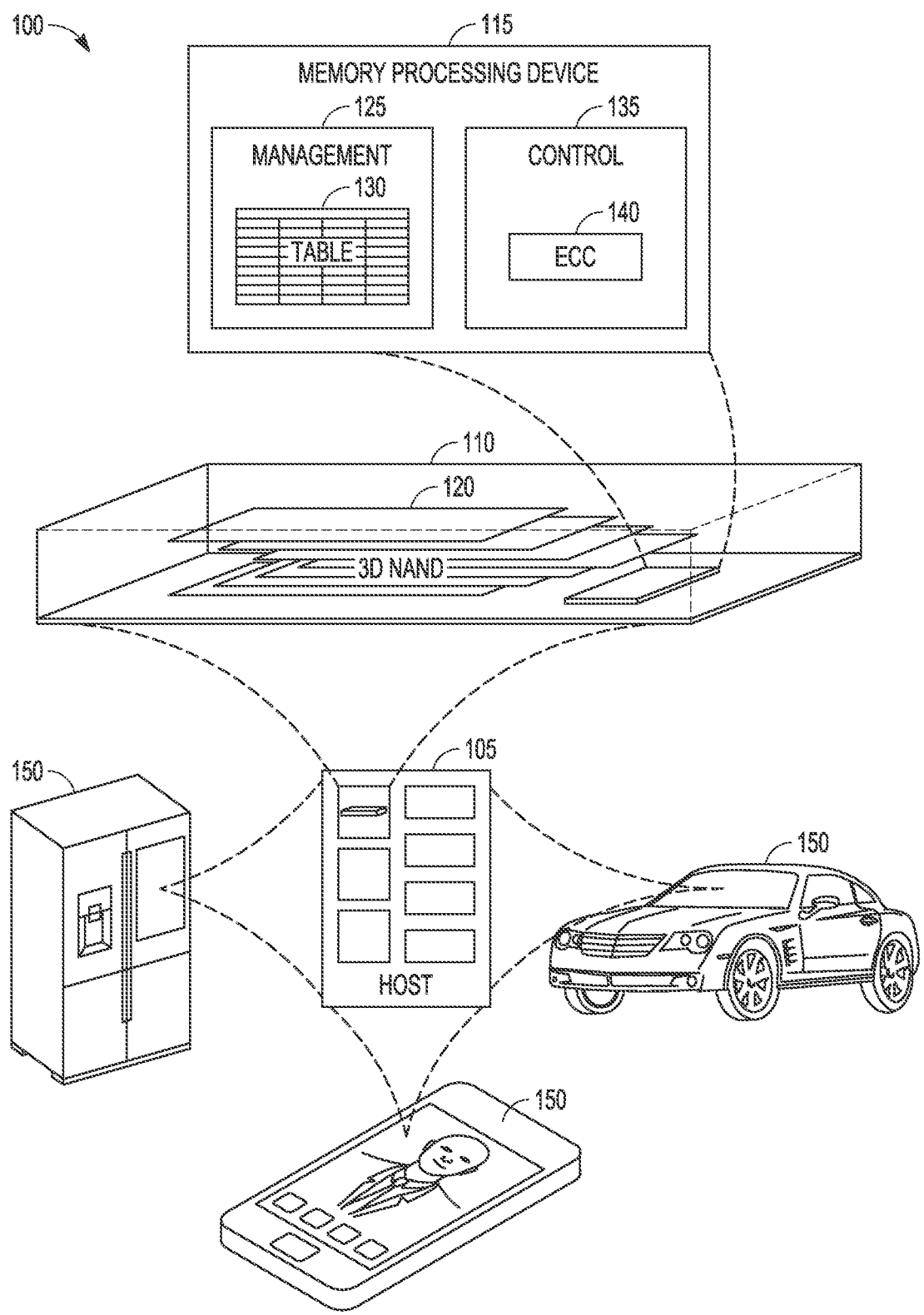
FIG. 1 illustrates an example of an environment including a memory device, according to various embodiments.

The following detailed description refers to the accompanying drawings that show, by way of illustration and not limitation, various embodiments in which an invention can be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

Typically, memory systems currently use a program continuation approach to APL impacted blocks or pages. This approach is performed by programming dummy data on APL impacted pages. Dummy data is written on these pages to help with floating gate coupling on adjacent word lines (WLs). Dummy data is benign information that does not contain any useful data but serves to reserve space where real data is nominally present and can be used as a placeholder for both testing and operational purposes. With dummy data written on these pages, these APL impacted pages are not included in a RAIN parity build.

An uncorrectable error correction code (UECC) error can indicate that the data stored within a block has become corrupted and can also indicate that a block or page is defective. When there is a UECC failure on any other page sharing the same parity group, the firmware (FW) should exclude these APL impacted pages from RAIN re-construction. This exclusion can be conducted by maintaining a bit map table pointing to all pages or blocks impacted by APL.

However, because of back-to-back APLs, there may be a significant number of blocks and a significant number of pages within a block that may get impacted by APL. Back-to-back APLs can occur in user testing with selected resolution times, which are unknown at the time of memory system construction. However, the impact of this testing should be taken into account in the memory system design. Providing coverage for a back-to-back APL scenario increases FW complexity as well as increasing memory space to be used, such as increasing random access memory (RAM) space, if a current approach to handling power loss is taken.

In various embodiments, information can be stored with data to identify memory pages that have been impacted by an APL. To facilitate this approach, a memory system can be arranged with multiple parity groups (N parity groups) to provide data protection to the memory system, where a parity group is a set of multiple data pages along with a parity page. The multiple data pages are pages in which data is written with parity data generated by the data in the multiple data pages. The parity data is written to the parity page of the parity group. The parity data can be constructed by performing exclusive-or (XOR) operations on the data written to the data pages and stored in the parity page of the parity group. For each parity group, information can be stored identifying that one or more data pages in the parity group has been impacted by a APL event or that no pages in the parity group have been impacted.

A flag can be maintained in metadata of every data page of each parity group of a memory system to indicate APL status of previous data pages that share the same parity group. A previous data page with respect to a given data page is a data page that precedes the given data page in an order of writing data to the data pages of the parity group. The order of the data pages in a parity group can be used in generating parity and re-constructing data following a UECC error in writing the data to a data page of the parity group. The APL status can be provided by the flag identifying the count of the previous data pages in the parity group that were impacted by an APL event, which can be stored as the number of previous data pages that were impacted by an APL event. If no data pages, which share the same parity group, experienced an APL event, the flag can indicate zero pages or be absent a number. The number set in the flag can be the number of consecutive data pages that were impacted by an APL immediately preceding the writing of data to a current data page in the parity group. The flag can be implemented as a byte in the metadata accompanying data stored in a data page. Other forms of information identifying APL status of previous data pages that share the same parity group may be stored in the metadata accompanying data stored in a data page.

Detection of the impact of APL can be made upon a boot-up after the APL in a number of ways. The memory system may interface with a host to which the memory system is coupled to determine that the write operation was not verified to the host. Information may be stored in metadata of a data page of a parity group, which information identifies that there was a successful write to the data page, while the lack of such information can indicate that the write to the data page was impacted by the APL. A processing device of a memory system may implemented to identify APL-affected cells by comparing one or more read level differences between physical pages. Other techniques can be used to determine that a data page of a parity group has been impacted by an APL.

In case of a UECC error on a data page in a parity group $Pn$ ($0 \le n \le (N-1)$), the FW can start RAIN recovery by reading from the last data page in the parity group $Pn$, with the parity group $Pn$ having an order from a first data page to a last data page. The flag in the metadata indicates if the previous data pages in the parity group $Pn$ are impacted by an APL. Depending on the flag status, any previous data pages that are tagged as APL impacted can be excluded from RAIN recovery.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory processing device 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory processing device 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory processing device 115 can include, among other things, circuitry or firmware, including one or more components or integrated circuits. For example, the memory processing device 115 can include one or more memory control units, circuits, or components configured to control access across the memory array 120 and to provide a translation layer between the host device 105 and the memory device 110. The memory processing device 115 can include one or more input/output (I/O) circuits, lines, or interfaces to transfer data to or from the memory array 120. The memory processing device 115 can include a memory manager 125 and an array controller 135.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory processing device 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory processing device 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory processing device 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory processing device 115. The memory processing device 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page; whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
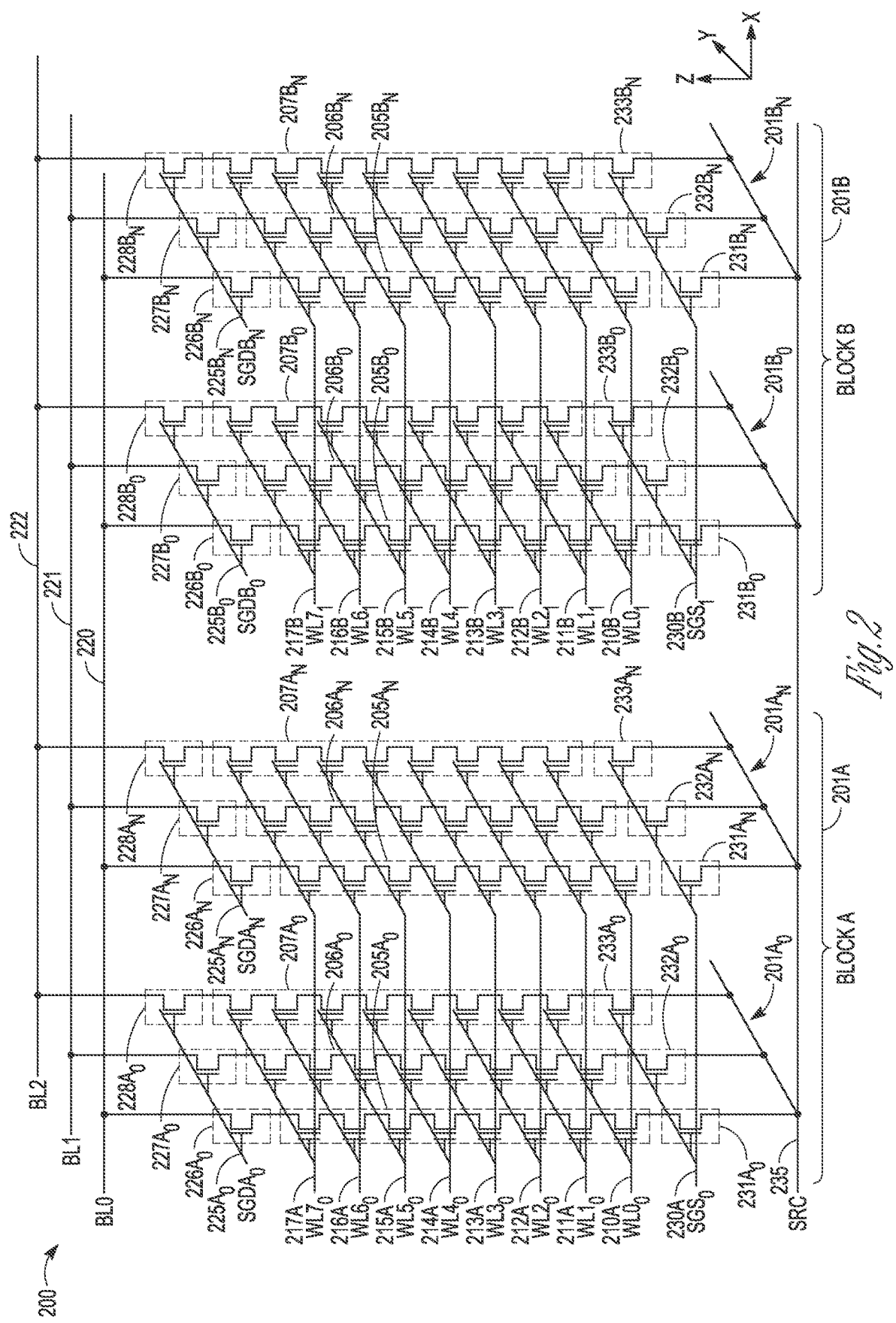
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$ 201$B_0$, sub-block $B_n$ 201$B_n$, etc.). The memory array 200 represents a portion of a greater number of similar structures than would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
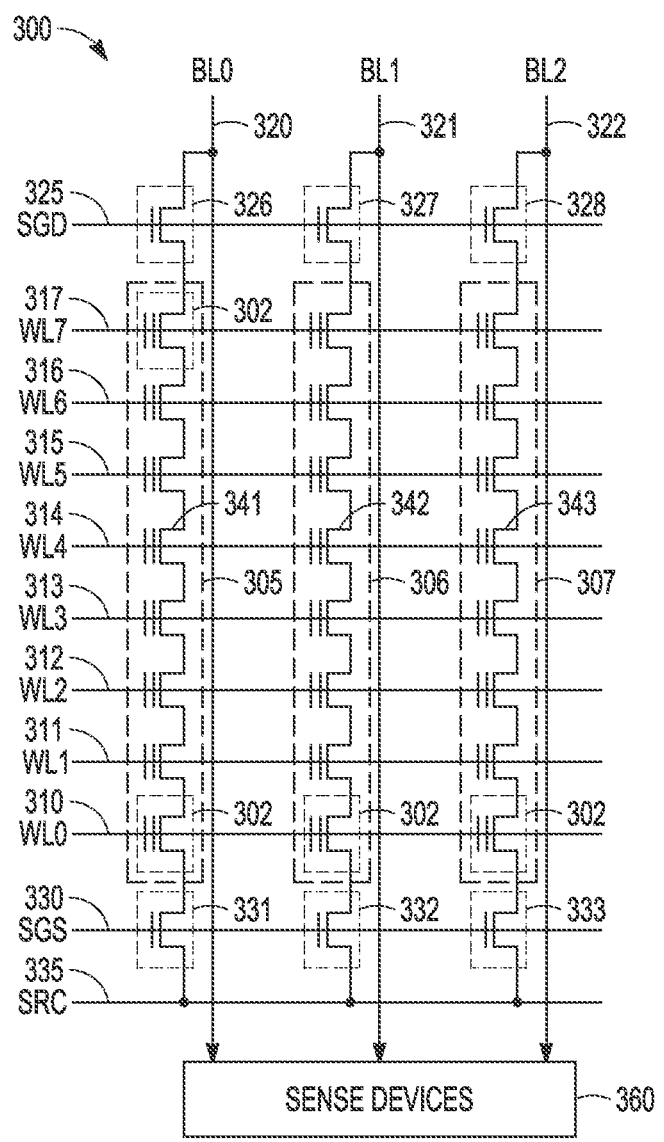

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense devices 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
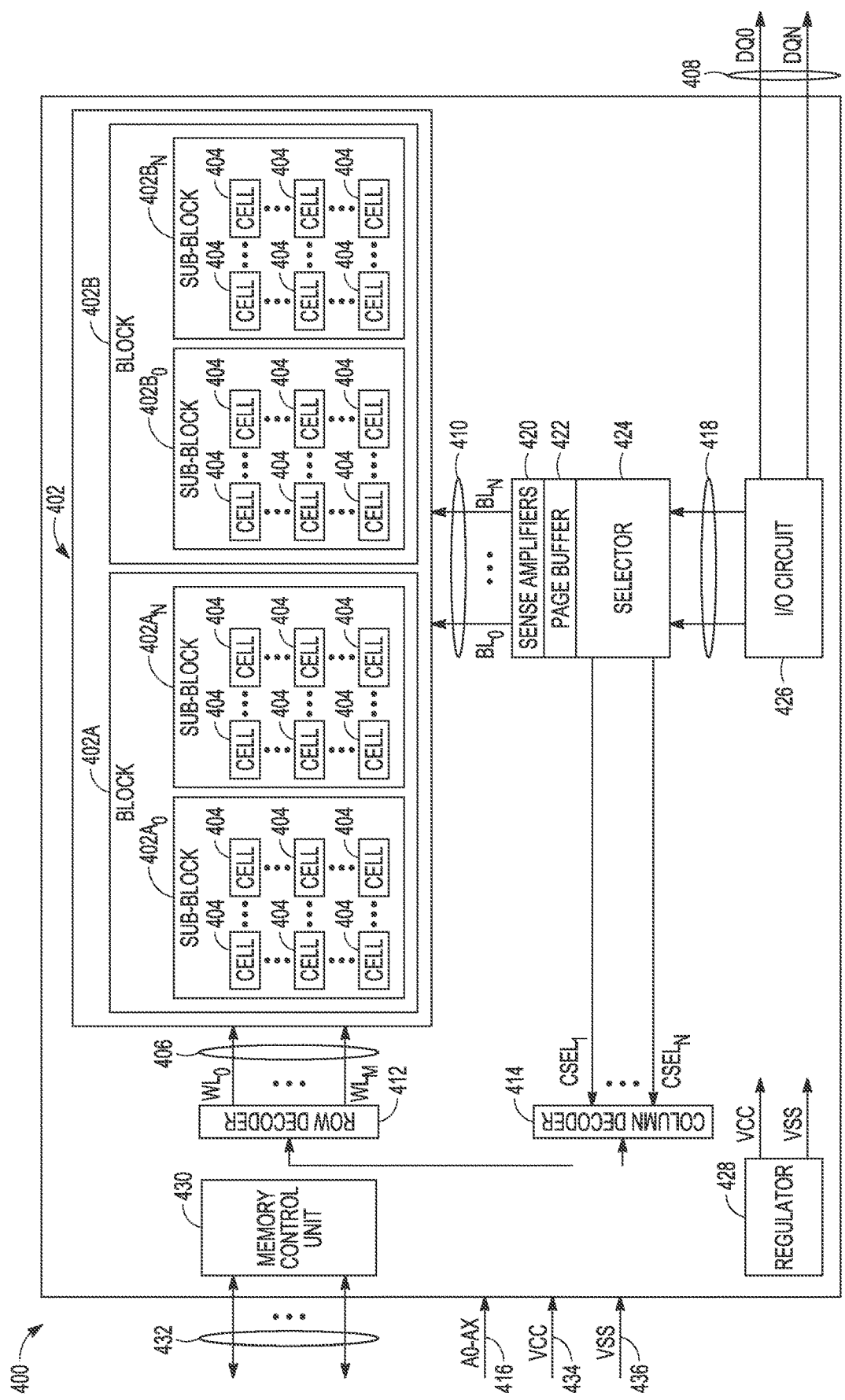
FIG. 4 illustrates an example block diagram of a memory module, according to various embodiments.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402 or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
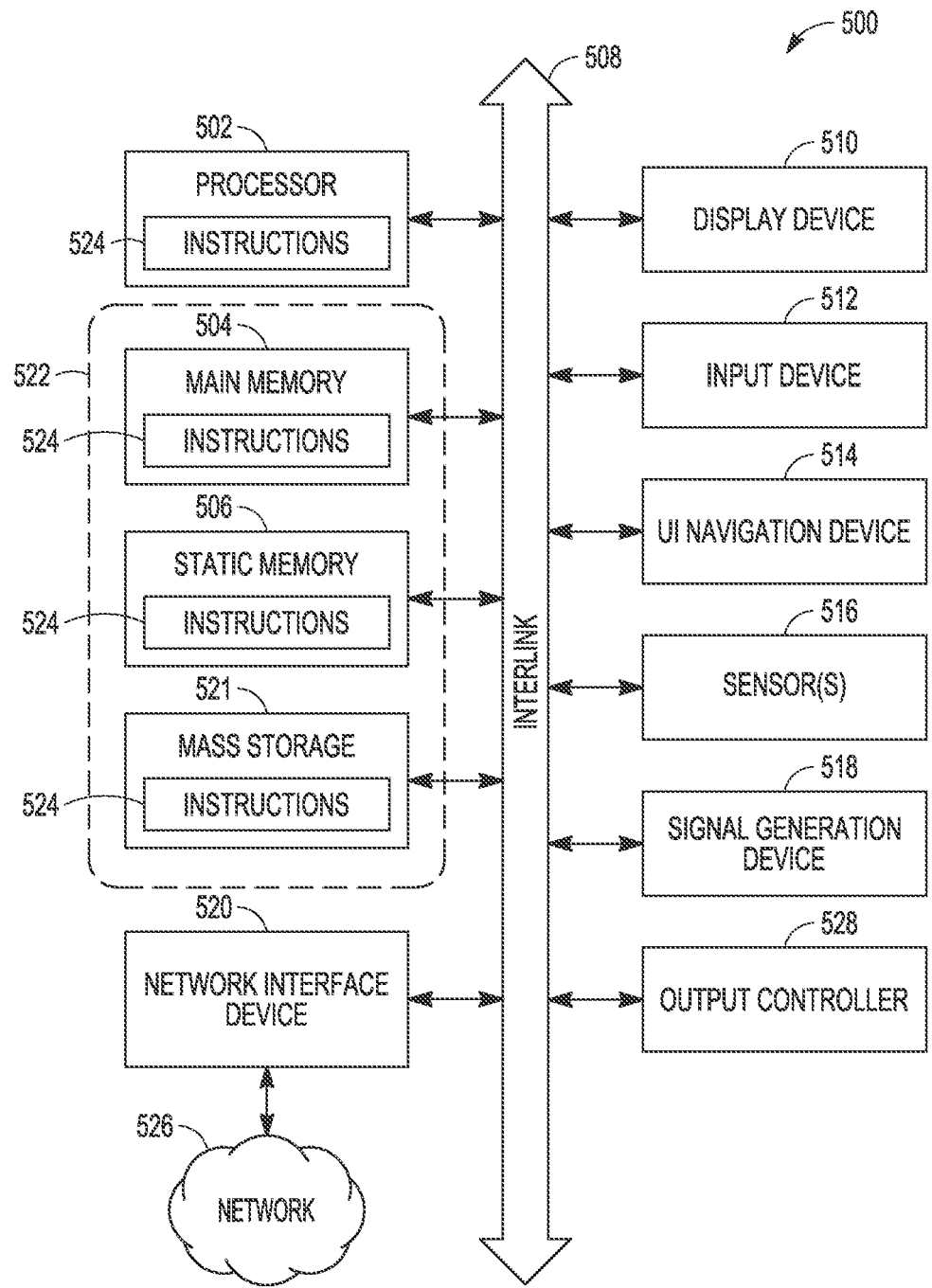
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a central processing unit (CPU), a graphics processing unit (GPU), a hardware processor core, or any combination thereof, such as the memory processing device 115, etc.), a main memory 504 and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 521 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine-readable medium 522.

While the machine-readable medium 522 is illustrated as a single medium, the term "machine-readable medium" may include a single medium or multiple media (e.g., a centralized or distributed database, or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off"

condition. The instructions 524 or data in use by a user or the machine 500 are typically loaded in the memory 504 for use by the processor 502. When the memory 504 is full, virtual space from the storage device 521 can be allocated to supplement the memory 504; however, because the storage device 521 is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging can take place in the compressed block until it is time to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission signal" shall be taken to include any signal that is capable of storing, encoding, or carrying instructions for execution by the machine 500, and includes digital or analog communications signals or other signals to facilitate communication of such software.

FIG. 6 is an embodiment of an example RAIN mapping table 600 illustrating a RAIN protection scheme using metadata to identify pages affected by an APL. The example RAIN mapping table 600 demonstrates use of a APL flag in a case of twelve pages/access lines (WL) with a three WL defect RAIN protection scheme. The access lines may be implemented as word lines. RAIN mapping table 600 shows a LUN 670 having four sub-blocks labelled SB #0 to SB #3 with each sub-block associated with a lower page (LP), an upper page (UP), and an extra page (XP), where LP, UP, and XP can be viewed as a three-bit cell. Associated with each one of LP, UP, and XP are fifteen access lines arranged in three parity groups, with each parity group having parity data associated with four access lines coupled to data pages.

Data, such as R0, written to data pages for access lines WL 0, WL 3, WL 6, and WL 9 of SB #0 of LP are in parity group P0, with parity P0 at parity page of access line WL 12 of SB #0 of LP. Data, such as R12, written to data pages for access lines WL 1, WL 4, WL 7, and WL 10 of SB #0 of LP are in parity group P12, with parity P12 associated with parity page of access line WL 13 of SB #0 of LP. Data, such as R24, written to data pages for access lines WL 2, WL 5, WL 8, and WL 11 of SB #0 of LP are in parity group P24, with parity P24 associated with page of access line WL 14 of SB #0 of LP. As shown in FIG. 6, LP of SB #0 is associated with three parity groups, P0, P12, and P24.

Data, such as R1, written to data pages for access lines WL 0, WL 3, WL 6, and WL 9 of SB #0 of UP are in parity group P1, with parity P1 at parity page of access line WL 12 of SB #0 of UP. Data, such as R13, written to data pages for access lines WL 1, WL 4, WL 7, and WL 10 of SB #0 of UP are in parity group P13, with parity P13 associated with parity page of access line WL 13 of SB #0 of UP. Data, such as R25, written to data pages for access lines WL 2, WL 5, WL 8, and WL 11 of SB #0 of UP are in parity group P25, with parity P25 associated with parity page of access line WL 14 of SB #0 of UP. As shown in FIG. 6, UP of SB #0 is associated with three parity groups, P1, P13, and P25.

Data, such as R2, written to data pages for access lines WL 0, WL 3, WL 6, and WL 9 of SB #0 of XP are in parity group P2, with parity P2 at parity page of access line WL 12 of SB #0 of XP. Data, such as R14, written to data pages for access lines WL 1, WL 4, WL 7, and WL 10 of SB #0 of XP are in parity group P14, with parity P14 associated with parity page of access line WL 13 of SB #0 of XP. Data, such as R26, written to data pages for access lines WL 2, WL 5, WL 8, and WL 11 of SB #0 of XP are in parity group P26, with parity P26 associated with parity page of access line WL 14 of SB #0 of XP. As shown in FIG. 6, XP of SB #0 is associated with three parity groups, P2, P14, and P26.

Each of the other sub-blocks from SB #1 through SB #3 can be arranged in the same manner as SB #0. For each page in this example case for a three-access line defect protection scheme, every third access line is used to generate a parity group, since a unique parity is generated within the three word lines to recover the data. The APL procedures, as taught herein, can be used in a N WL defect RAIN protection scheme, with N being an integer different from three. The arrangement of every third access line used to generate a parity group can provide an ordering of the data pages of the generated parity group. In the example of FIG. 6 for parity group P0 of LP in SB #), the data page having access line WL 0 can be designated a first data page of parity group P0; the data page having access line WL 3 can be designated a second data page of parity group P0; the data page having access line WL 6 can be designated a third data page of parity group P0; and the data page having access line WL 9 can be designated a fourth data page of parity group P0. With this ordering, data pages WL0/SB #0/LP and WL3/SB #0/LP are previous pages to data page WL6/SB0/LP. The ordering of the data pages can increase with the increase in numbering of the access lines.

As an example, it is assumed that APL events happened on the data pages WL0/SB #0/LP and WL3/SB #0/LP with respect to the ordering of RAIN mapping table 600. Both these pages fall under parity group P0. While writing the next data page, WL6/SB0/LP, which also falls under parity group P0, a flag can be set indicating that the two previous data pages (WL0/SB #0/LP and WL3/SB #0/LP) of the parity group P0 are impacted by APL. As shown in RAIN mapping table 600, flag on WL6/SB0/LP page is set to 2. This flag can be set in the metadata for the data in the WL6/SB0/LP data page when writing the data. The flag can use a byte of the metadata accompanying the data R0 written to the WL6/SB0/LP data page.

A flag set in the metadata of a data page can be used during a UECC data recovery using the RAIN scheme associated with the RAIN mapping table 600. In the example of FIG. 6, assume a UECC error happened on the WL9/SB0/LP data page. In a RAIN recovery process, all the pages within the parity group P0 are read to re-construct the failing page data. While reading WL6/SB0/LP, the flag status is read as two, which identifies that the two previous pages in the same RAIN parity group P0 were impacted by APL and should be excluded from the RAIN data recovery.

In a different example, with two data pages of a parity group experiencing an APL but separated in the parity group by a data page for which the data was written without an APL, a flag, with the data written without an APL, can be set to the number of consecutive pages in the priority group that experienced an APL. This flag identifies the APL for the data page before the data page written without an APL. Then, in a next page in which data is written without an APL, following the second APL, a flag is set with the data written without an APL to identify the second APL associated with writing data in the immediately preceding page. For example, consider for UP of SB #0: an APL at data page WL0/SB #0/UP, a successful write at WL3/SB #0/UP, an APL at data page WL6/SB #0/UP, and a successful write at data page WL9/SB #0/UP. An embodiment, for this example, can include setting a flag equal to one in the metadata of each of data pages WL3/SB #0/UP and WL9/SB #0/UP.

Though FIG. 6 shows RAIN mapping table 600 illustrating a RAIN protection scheme for a single LUN, a similar protection scheme protection can be used in a memory system having multiple LUNs. This approach can be implemented with FW identifying pages among the LUNs to form different parity groups and implementing the generation and use of a flag to handle APLs as discussed above. The flag can be included in the metadata appended to data being stored in a page in the memory system. Other information in the metadata for the data can include one or more temperature readings and a logical address for the data being stored in the page. The temperature reading can include the temperature at which the data is being written in the page.

With the use of a flag in metadata in a data page of a parity group to handle data protection with respect to an APL, the use of a bit map table pointing to all pages/blocks impacted by APL as used in current systems can be avoided. This avoidance can eliminate associated increases in RAM space and firmware complexity to handle power loss. The use of a flag, as taught herein, can be managed by firmware for a memory system. The firmware can manage parity protection, such as RAIN protection, implemented for the memory system. The firmware can be implemented to control the assignment of data pages to each parity group of multiple parity groups and control the ordering of the data pages within each parity group. The ordering can be realized by a numbering of access lines to the data pages, each data page of the parity group coupled to an access line different from the other data pages of the parity group. This ordering can be used for the order of writing data to the data pages of the parity group. Such firmware can implement a mapping similar to that of RAIN mapping table 600.

A mapping similar to that of RAIN mapping table 600 can be implemented in a system comprising a processing device and a memory system including multiple parity groups arranged for data protection of the memory system. Each parity group of the multiple parity groups can have multiple data pages in which to write data and at least one parity page in which to write parity data generated from the data written in the multiple data pages. Each data page can have storage capacity to include metadata of data written to the data page with a flag allocated a location in the metadata to identify an asynchronous power loss status of one or more data pages that precede the data page in an order of writing data to the data pages of the parity group. For a first data page in a parity group, the flag can be set to zero, since there are no data pages that precede the first data page in an order of writing data to the data pages of the parity group. Initially, the flag in the metadata of each data page of a parity group can be set to zero and then updated with a successful write to the data page.

The multiple parity groups can be arranged in sub-blocks of the memory system and each parity group can have four data pages in which to write data. Alternatively, the multiple parity groups can be arranged in sub-blocks of the memory system and each parity group can have a number data pages different from four in which to write data.

The asynchronous power loss status of one or more data pages can include an asynchronous power loss impacted status in which completion of a write operation of the data to a preceding data page in the order is prevented. The system can include firmware operable with the processing device, for each parity group, to exclude data pages of the parity group, tagged as asynchronous power loss impacted, in a re-construction of data following a UECC error in writing to a selected data page of the parity group.

Figure 7:
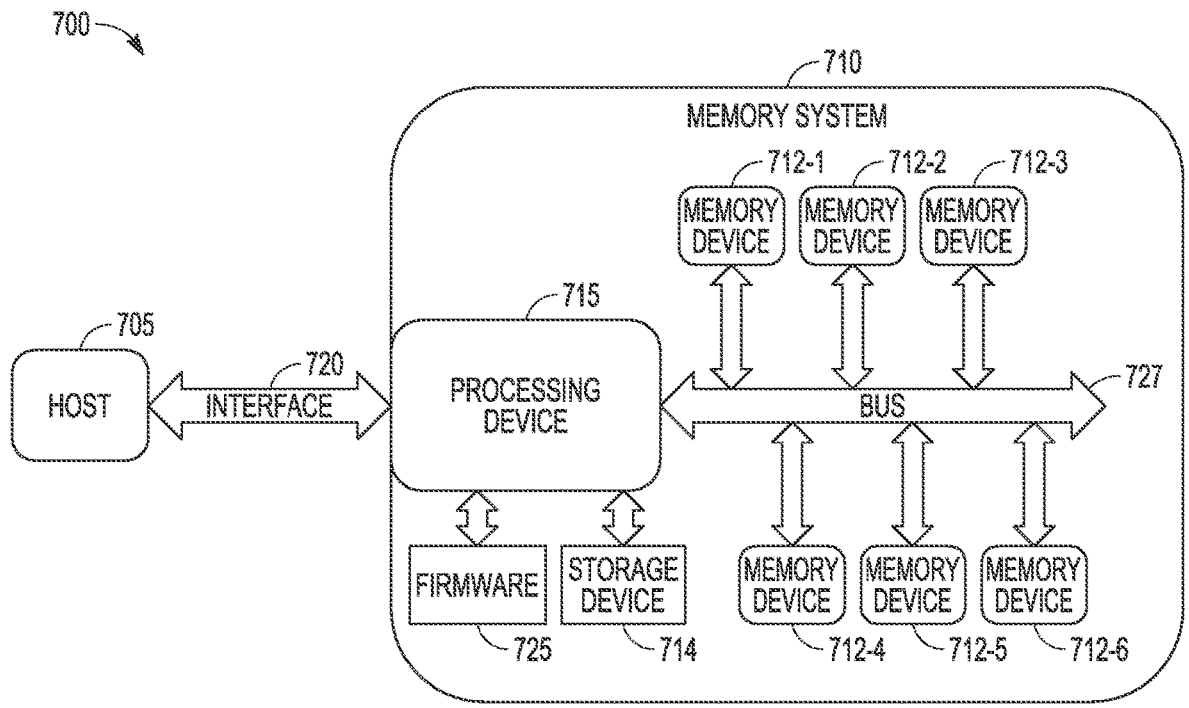
FIG. 7 is a block diagram of an embodiment of example system including a host that operates with a memory system having multiple memory devices with parity protection that can handle asynchronous power loss, according to various embodiments.

FIG. 7 is a block diagram of an embodiment of example system including a host 705 that operates with a memory system 710 having multiple memory devices with parity protection that can handle asynchronous power loss. The host 705 is coupled to the memory system 710 by an interface 720. The memory system 710 can include a processing device 715 coupled to memory devices 712-1, 712-2, 712-3, 712-4, 712-5, and 712-6 by a bus 727. The memory devices 712-1, 712-2, 712-3, 712-4, 712-5, and 712-6 may be NAND memory devices. Though six memory devices are shown in FIG. 7, the memory system 710 can be implemented with less or more than six memory devices, that is memory system 710 can comprise one or more memory devices. The memory devices can be realized in a number of formats including but not limited to a plurality of memory dies. The processing device 715 can include or be structured as one or more processors.

The memory system 700 can comprise firmware 725 having code executable by the processing device 715 to at least manage the memory devices 712-1, 712-2, 712-3, 712-4, 712-5, and 712-6. The firmware 725 can reside in a storage device of the memory system 710 coupled to the processing device 715. The firmware 725 can be coupled to the processing device 715 using the bus 727 or some other interface on the memory system 710. Alternatively, the firmware 725 can reside in the processing device 715 or can be distributed in the memory system 710 with firmware components, such as but not limited to code, including one or more components in the processing device 715. The firmware 725 can include code having instructions, executable by the processing device 715, to operate on the memory devices 712-1, 712-2, 712-3, 712-4, 712-5, and 712-6. The instructions can include instructions to execute parity protection for data programmed into multiple memory devices of the memory system 710, as taught herein, where information stored in data pages of a parity group is used to provide data protection to memory system 710 that can handle APL. The parity scheme can be implemented as a RAIN scheme.

The system 700 and its components can be structured in a number of different arrangements. For example, the system 700 can be arranged with a variation of the type of components that comprise the host 705, the interface 720, the memory system 710, the memory devices 712-1, 712-2, 712-3, 712-4, 712-5, and 712-6, the processing device 715, and the bus 729. The host 705 can comprise one or more processors, which can vary in type. The interface 720 can be arranged as, but not limited to, a peripheral component interconnect express (PCIe) interface. The memory system 710 can be, but is not limited to, a SSD. The memory devices 712-1, 712-2, 712-3, 712-4, 712-5, and 712-6 can be NAND memory devices. The processing device 715 can include or be structured as one or more types of processors compatible with the memory devices 712-1, 712-2, 712-3, 712-4, 712-5, and 712-6. The bus 727 can be an open NAND flash interface (ONFI) bus for the memory devices 712-1, 712-2, 712-3, 712-4, 712-5, and 712-6 being NAND flash memory devices. A storage device 714 can be implemented to provide data or parameters used in maintenance of the memory system 710. A storage device 714 can include a RAM. Though the storage device 714 is external to processing device 715 in memory system 710 in FIG. 7, the storage device 714 may be integrated into the processing device 715. The storage device 714 can be coupled to the bus 727 for communication with other components of the memory system 710. Alternatively, the storage device 714 can be coupled with processing device 715 in which the processing device 715 handles communications between the storage device 714 and other components of the memory system 710. The storage device 714 can be coupled to the bus 727 and to the processing device 715.

In various embodiments, the firmware 725 can have instructions, executable by the processing device 715, to operate on multiple memory devices of the memory devices 712-1, 712-2, 712-3, 712-4, 712-5, and 712-6. The operations can include providing multi-page parity protection with power loss handling for the memory system 710. The firmware can operate on multiple parity groups of the memory system 710 arranged for data protection of the memory system 710. Each parity group of the multiple parity groups can have multiple data pages in which to write data and at least one parity page in which to write parity data generated from the data written in the multiple data pages. Each data page can have storage capacity to include metadata of data written to the data page. Instructions of the firmware 725 stored executed by the processing device 715 can include operations, for each parity group of the multiple parity groups, to write data to the multiple data pages of the parity group, and set a flag in the metadata of a data page of the parity group in which the data is successfully written. The flag can identify that one or more data pages that preceded the data page in an order of writing data to the multiple data pages of the parity group was impacted by an asynchronous power loss that prevented completion of a write operation to the one or more data pages. The flag can be used to exclude data pages of the parity group, tagged as asynchronous power loss impacted, in a re-construction of data following a UECC error in writing to a data page of the parity group. The operations can include performing various functions providing multi-page parity protection with power loss handling for the memory system 710, as taught herein.

In various embodiments, a system can comprise multiple parity groups arranged for data protection of a memory system. The multiple parity groups can include a first parity group having multiple data pages in which to write data and at least one parity page in which to write parity data generated from the data written in the multiple data pages. The multiple data pages can include a given data page including: metadata of data written to the given data page; and a flag allocated in the metadata to identify an asynchronous power loss status of one or more data pages that precede the given data page in an order of writing data to the data pages of the parity group. In some instances herein, the term "given data page" is used when identifying a property or characteristic of an individual data page, of multiple data pages, wherein such individual data page under discussion may be at any location in a write sequence of multiple pages.

The asynchronous power loss status of one or more data pages can include an asynchronous power loss impacted status in which completion of a write operation of the data to a preceding data page in the order is prevented. Such a system can include processing device and firmware. The firmware can be operable with the processing device, for each parity group, to exclude data pages of the parity group, tagged as asynchronous power loss impacted, in a re-construction of data following an uncorrectable error correction code error in writing to a selected data page of the parity group.

The multiple data pages of the first parity group can include at least another data page having: metadata of data written to the other data page; and a flag allocated in the metadata to identify an asynchronous power loss status of one or more data pages that precede the other data page in an order of writing data to the multiple data pages of the parity group. In addition, the multiple parity groups of the systems can be arranged in sub-blocks of the memory system.

Figure 8:
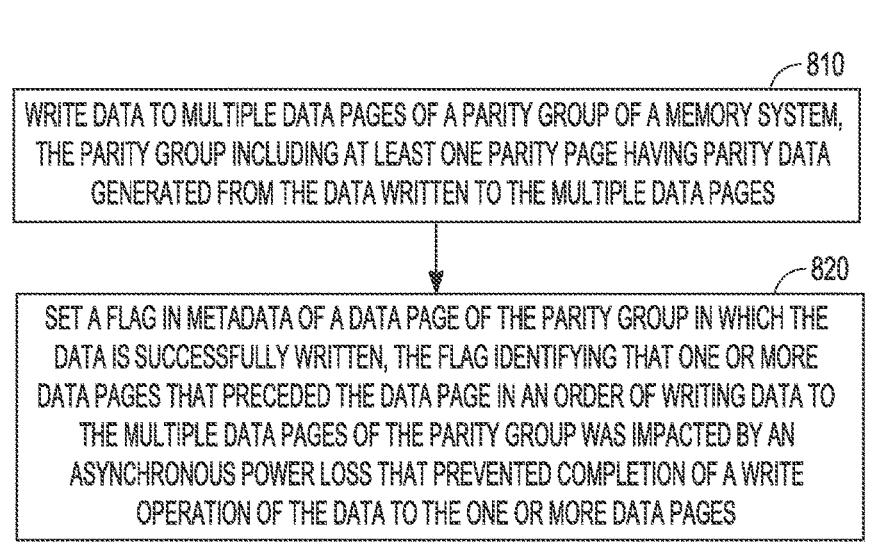
FIG. 8 is a block diagram of features of an example method of implementing a parity protection scheme of data in a memory system to handle power loss conditions, according to various embodiments.

FIG. 8 is a block diagram of features of an embodiment of an example method 800 of implementing a parity protection scheme of data in a memory system to handle power loss conditions. Method 800 can be implemented using a processing device executing instructions stored in firmware. At 810, data is written to multiple data pages of a parity group of a memory system, the parity group including at least one parity page having parity data generated from the data written to the multiple data pages.

At 820, a flag is set in metadata of a data page of the parity group in which the data is successfully written. The flag can identify that one or more data pages that preceded the data page in an order of writing data to the multiple data pages of the parity group was impacted by an APL that prevented completion of a write operation of the data to the one or more data pages. Setting the flag in the metadata of the data page can include setting, in the data page in which the data is successfully written, a count of data pages of the parity group, impacted by APL, that preceded, in the order of writing data to the multiple data pages of the parity group, the data page in which the data is successfully written. The count is a positive integer. If no such preceding page was impacted by the APL, the flag can be set to a value of zero. If there is no preceding page to the data page of the parity group in which the data is successfully written, the flag can be set to a value of zero.

Variations of method 800 or methods similar to method 800 can include a number of different embodiments that may be combined depending on the application of such methods and/or the architecture of systems in which such methods are implemented. Such methods can include using the flag to exclude one or more of the data pages of the parity group impacted by APL in a re-construction of the data following a UECC error in writing to a selected data page of the parity group. The selected data page can be a data page of the parity group that was the most currently written to data page after a successful write operation. The re-construction can be started by reading from a last data page of data written in the parity group. The parity group can be arranged as an ordered set of multiple pages and parity page. In such an ordered set, the parity page of the parity group can follow the last page to which data is written in the parity group.

Variations of method 800 or methods similar to method 800 can include maintaining a flag in each data page of the parity group to identify status, with respect to APL, of one or more data pages that preceded the data page in the order of writing data to the multiple data pages of the parity group. The status can be implemented as a count of preceding pages impacted, which count can include the a value of zero for a page in which preceding pages are not impacted by a power loss. The flag can be allocated a location in metadata in the page in which the data associated with the metadata is written. The flag may be implemented as a byte in the page, though other storage sizes can be used. The flag location may be in a predetermined location in the metadata or in a location in the metadata dynamically selected with changes such as additions to the metadata. Variations of method 800 or methods similar to method 800 can include maintaining, in the metadata of each data page of the parity group, a logical address for the data being stored in the data page.

Firmware for operation of one or more memory devices can comprise instructions, such as a microcode, which when executed by a processing device, can cause performance of operations, the operations including operations to write data to multiple data pages of a parity group, the parity group including a parity page in which to write parity data generated from the data written in the multiple data pages. The operations executed by the processing device can include operations to set a flag in a metadata of a given data page of the parity group in which the data is successfully written, the flag identifying that one or more data pages that preceded the given data page in an order of writing data to the multiple data pages of the parity group was impacted by an APL that prevented completion of a write operation to the one or more data pages. The parity group can be included with multiple parity groups of a memory system, where the multiple parity groups are arranged for data protection of the memory system. Each parity group of the multiple parity groups can have multiple data pages in which to write data and at least one parity page in which to write parity data generated from the data written in the multiple data pages, with each data page having storage capacity to include metadata of data written to the data page. The processing device can be implemented as a set of one or more processing devices, such as but not limited to a set of one or more processors, a set of one or more memory controllers, or combinations thereof.

The operations performed by executing instructions of firmware by a processing device can include operations to perform the tasks of method 800 or methods similar to method 800. The operations performed by executing instructions of firmware by a processing device can include operations to perform functions of systems as taught herein. Variations of instructions of the above firmware or similar firmware can include a number of different embodiments that may be combined depending on the application of such firmware and/or the architecture of systems in which such firmware is implemented. Such instructions of the firmware, which when executed by a processing device, can cause performance of operations, which operations can include setting the flag in the metadata of the data page by setting, in the data page in which the data is successfully written, a count of data pages of the parity group, impacted by APL, that preceded, in the order of writing data to the multiple data pages of the parity group, the data page in which the data is successfully written. The count can be a positive integer. If no such preceding page was impacted by the APL, the flag can be set to a value of zero. If there is no preceding page to the data page of the parity group in which the data is successfully written, the flag can be set to a value of zero. The flag can be implemented using a byte of the metadata.

The metadata can include other information regarding the given data page. For example, the metadata can include one or more temperature readings associated with the given data page in which the data is successfully written. The metadata can include a logical address for the data being stored in the given data page.

Instructions of the firmware, which when executed by a processing device, can cause performance of operations, where operations can include use of the flag to exclude one or more of the data pages of the parity group in a re-construction of data in a selected data page of the parity group in which an uncorrectable error correction code error occurred. The re-construction can start by reading from a last data page of data written in the parity group. The order of writing data to the data pages of the parity group can be defined by a numbering of access lines to the data pages, where each data page of the parity group is coupled to an access line different from the other data pages of the parity group.

Instructions of the firmware, which when executed by a processing device, can cause performance of operations, where operations can include maintaining, in each data page of a parity group, a flag to identify status, with respect to APL, of one or more data pages that preceded the data page in the order of writing data to the data pages of the parity group. The status can include whether or not the preceding data page was impacted by an APL.

In various embodiments, a system can comprise a processing device, a memory system including multiple parity groups arranged for data protection of the memory system, and firmware having stored instructions, executable by the processing device, to perform operations, including operations for each parity group of the multiple parity groups. Each parity group of the multiple parity groups can have multiple data pages in which to write data and at least one parity page in which to write parity data generated from the data written in the multiple data pages, where each data page can have storage capacity to include metadata of data written to the data page. The operations for each parity group of the multiple parity groups, can include operations to: write data to the multiple data pages of the parity group; and set a flag in the metadata of a data page of the parity group in which the data is successfully written. The flag can identify that one or more data pages that preceded the data page in an order of writing data to the multiple data pages of the parity group was impacted by an APL that prevented completion of a write operation to the one or more data pages.

The metadata in a data page can include information associated with data written into the data page and/or information associated with parameters of the data page. The metadata can include one or more temperature readings associated with the data page in which the data is successfully written. The metadata in a data page can include a logical address for the data being stored in the data page. The flag in metadata can be a byte of the metadata. Other sizes for the flag can be implemented. The flag can be a count of data pages of the parity group impacted by APL that preceded, in the order of writing data, the data page of the parity group in which the data is successfully written. Each data page of the parity group can maintain a flag to identify status, with respect to APL, of one or more data pages that preceded the data page in the order of writing data to the data pages of the parity group. The flag can have a count of zero in data pages of the parity group in which the data is successfully written without data pages, which preceded the data page in an order of writing data to the data pages of the parity group, being impacted by APL. The flag can also have a count of zero in a data page of the parity group that has no preceding data pages in the order of writing data to the data pages of the parity group. The order of writing data to the data pages of the parity group can be defined by a numbering of access lines to the data pages, where each data page of the parity group is coupled to an access line different from the other data pages of the parity group.

Variations of a system, as taught herein, can include operations, for each parity group, that include use of the flag to exclude one or more of the data pages of the parity group in a re-construction of data in a selected data page of the parity group in which an uncorrectable error correction code error occurred. The re-construction cam start by reading from a last data page of data written in the parity group. Variations of a system and its features, as taught herein, can include a number of different embodiments that may be combined depending on the application of such systems and/or the architecture in which systems are implemented.

The following are example embodiments of systems and methods, in accordance with the teachings herein.

An example system 1 can comprise: multiple parity groups arranged for data protection of a memory system, the multiple parity groups including: a first parity group having multiple data pages in which to write data and at least one parity page in which to write parity data generated from the data written in the multiple data pages, and the multiple data pages including: a given data page including: metadata of data written to the given data page; and a flag allocated in the metadata to identify an asynchronous power loss status of one or more data pages that precede the given data page in an order of writing data to the data pages of the parity group.

An example system 2 can include features of example system 1 and can include the asynchronous power loss status of one or more data pages to include an asynchronous power loss impacted status in which completion of a write operation of the data to a preceding data page in the order is prevented.

An example system 3 can include features of any of the preceding example systems and can include processing device; and firmware operable with the processing device, for each parity group, to exclude data pages of the parity group, tagged as asynchronous power loss impacted, in a re-construction of data following an uncorrectable error correction code error in writing to a selected data page of the parity group.

An example system 4 can include features of any of the preceding example systems and can include the multiple data pages include at least another data page having: metadata of data written to the other data page; and a flag allocated in the metadata to identify an asynchronous power loss status of one or more data pages that precede the other data page in an order of writing data to the multiple data pages of the parity group.

An example system 5 can include features of any of the preceding example systems and can include the multiple parity groups arranged in sub-blocks of the memory system.

An example system 6 can comprise: firmware having stored instructions, executable by a processing device, to perform operations to: write data to multiple data pages of a parity group, the parity group including a parity page in which to write parity data generated from the data written in the multiple data pages; and set a flag in a metadata of a given data page of the parity group in which the data is successfully written, the flag identifying that one or more data pages that preceded the given data page in an order of writing data to the multiple data pages of the parity group was impacted by an asynchronous power loss that prevented completion of a write operation to the one or more data pages.

An example system 7 can include features of example system 6 and can include the flag being a byte of the metadata.

An example system 8 can include features of any of the preceding example systems 6 and 7 and can include the flag being a count of data pages of the parity group impacted by asynchronous power loss that preceded, in the order of writing data, the given data page of the parity group in which the data is successfully written.

An example system 9 can include features of any of the preceding example systems 6-8 and can include the metadata to include one or more temperature readings associated with the given data page in which the data is successfully written.

An example system 10 can include features of any of the preceding example systems 6-9 and can include the operations, for each parity group, to include use of the flag to exclude one or more of the data pages of the parity group in a re-construction of data in a selected data page of the parity group in which an uncorrectable error correction code error occurred.

An example system 11 can include features of any of the preceding example systems 6-10 and can include the re-construction to start by reading from a last data page of data written in the parity group.

An example system 12 can include features of any of the preceding example systems 6-11 and can include each data page of the parity group to maintain a flag to identify status, with respect to asynchronous power loss, of one or more data pages that preceded the data page in the order of writing data to the data pages of the parity group.

An example system 13 can include features of any of the preceding example systems 6-12 and can include the flag being a count of zero in data pages of the parity group in which the data is successfully written without data pages, which preceded the data page in an order of writing data to the data pages of the parity group, being impacted by asynchronous power loss.

An example system 14 can include features of any of the preceding example systems 6-13 and can include the order of writing data to the data pages of the parity group being defined by a numbering of access lines to the data pages, each data page of the parity group coupled to an access line different from the other data pages of the parity group.

An example method 1 can comprise: writing, using a processing device executing instructions stored in firmware, data to multiple data pages of a parity group of a memory system, the parity group including at least one parity page having parity data generated from the data written to the multiple data pages; and setting a flag in metadata of a data page of the parity group in which the data is successfully written, the flag identifying that one or more data pages that preceded the data page in an order of writing data to the multiple data pages of the parity group was impacted by an asynchronous power loss that prevented completion of a write operation of the data to the one or more data pages.

An example method 2 can include features of example method 1 and can include setting the flag in the metadata of the data page to include setting, in the data page in which the data is successfully written, a count of data pages of the parity group, impacted by asynchronous power loss, that preceded, in the order of writing data to the multiple data pages of the parity group, the data page in which the data is successfully written.

An example method 3 can include features of any of the preceding example methods and can include using the flag to exclude one or more of the data pages of the parity group impacted by asynchronous power loss in a re-construction of the data following an uncorrectable error correction code error in writing to a selected data page of the parity group.

An example method 4 can include features of any of the preceding example methods and can include starting the re-construction by reading from a last data page of data written in the parity group.

An example method 5 can include features of any of the preceding example methods and can include maintaining a flag in each data page of the parity group to identify status, with respect to asynchronous power loss, of one or more data pages that preceded the data page in the order of writing data to the multiple data pages of the parity group.

An example method 6 can include features of any of the preceding example methods and can include maintaining, in the metadata of each data page of the parity group, a logical address for the data being stored in the data page.

An example method 7 can include features of any of the preceding example methods and can include performing functions associated with any features of example systems 1-5 and example systems 6-14.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.).

According to one or more embodiments, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer-readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A method of handling asynchronous power loss to a memory system, the method comprising:
    writing data to multiple data pages of a parity group, the parity group including a parity page in which to write parity data generated from the data written in the multiple data pages; and
    maintaining a flag in metadata of each data page of the multiple data pages to identify asynchronous power loss status of previous data pages of the parity group.

2. The method of claim 1, wherein the method includes generating the parity data using an ordering of the data pages in the parity group.

3. The method of claim 1, wherein the method includes, following an uncorrectable error correction code error in writing the data, re-constructing data to a data page of the parity group using an ordering of the data pages in the parity group.

4. The method of claim 3, wherein the method includes:
starting recovery to re-construct the data to the data page by reading from a last data page in the parity group; and
excluding, from the recovery, previous data pages tagged, using the flag, as impacted by asynchronous power loss.

5. The method of claim 1, wherein maintaining the flag in the metadata of each data page includes implementing the flag as a byte in the metadata accompanying data stored each data page.

6. The method of claim 1, wherein the method includes detecting impact of asynchronous power loss upon a boot-up of the memory system after the asynchronous power loss.

7. A method of handling asynchronous power loss to a memory system, the method comprising:
arranging multiple parity groups for data protection of the memory system, the multiple parity groups arranged in sub-blocks of the memory system, each parity group of the multiple parity groups having multiple data pages in which to write data and having at least one parity page in which to write parity data generated from the data written in the multiple data pages;
writing data to a parity group of the multiple parity groups; and
maintaining a flag in metadata of each data page of the parity group to which the data is written, the flag to identify asynchronous power loss status of previous data pages of the parity group.

8. The method of claim 7, wherein the metadata of each data page in which the data is successfully written includes a logical address for the data being stored in the data page.

9. The method of claim 7, wherein arranging multiple parity groups in a sub-block includes assigning each parity group of the multiple parity groups in the sub-block to a set of access lines to memory cells of the memory system, the assignment of access lines of each set to each parity group based on a numbering of the access lines.

10. The method of claim 9, wherein the method includes providing the data protection segmented on a fixed number of access lines of each set.

11. The method of claim 7, wherein the flag identifies a count of consecutive previous data pages in the parity group that were impacted by an asynchronous power loss event.

12. The method of claim 11, wherein a number set in the flag is a number of data pages impacted by an asynchronous power loss event immediately preceding writing of data to a current data page in the parity group.

13. The method of claim 7, wherein the method includes associating each sub-block with a lower page, an upper page, and an extra page.

14. A memory system comprising:
multiple memory devices; and
a memory controller including processing circuitry having one or more processors, the memory controller configured to perform operations comprising:
arranging multiple parity groups for data protection of data programmed into the multiple memory devices of the memory system, the multiple parity groups arranged in sub-blocks of the memory system, each parity group of the multiple parity groups having multiple data pages in which to write data and having at least one parity page in which to write parity data generated from the data written in the multiple data pages;
writing data to a parity group of the multiple parity groups; and
maintaining a flag in metadata of each data page of the parity group to which the data is written, the flag to identify asynchronous power loss status of previous data pages of the parity group.

15. The memory system of claim 14, wherein the asynchronous power loss status of one or more data pages includes an asynchronous power loss impacted status in which completion of a write operation of the data to a preceding data page, in an order of the data pages, was prevented.

16. The memory system of claim 14, wherein the operations include excluding data pages of the parity group, tagged as asynchronous power loss impacted, in a reconstruction of data following a uncorrectable error correction code error in writing to a selected data page of the parity group.

17. The memory system of claim 14, wherein arranging multiple parity groups in a sub-block includes assigning each parity group of the multiple parity groups in the sub-block to a set of access lines to memory cells of the memory system, the assignment of access lines of each set to each parity group based on a numbering of the access lines.

18. The memory system of claim 17, wherein the operations include providing the data protection segmented on a fixed number of access lines of each set.

19. The memory system of claim 14, wherein the operations include generating each parity group from a selection of every Nth access line of a set of access lines to memory cells of a memory device of the multiple memory devices, N being an integer greater than one, the selection providing an ordering of the data pages of the generated parity group.

20. The memory system of claim 14, wherein the metadata of a data page includes information, in addition to the flag, identifying asynchronous power loss status of previously written data pages that share the same parity group.

* * * * *